US005537970A

United States Patent [19]

Hart

[11] Patent Number: 5,537,970

[45] Date of Patent: Jul. 23, 1996

[54] APPARATUS AND METHOD FOR DETERMINING PISTON DIMENSION

[75] Inventor: Richard W. Hart, Warren, Mich.

[73] Assignee: General Motors Corporation, Detroit, Mich.

[21] Appl. No.: 229,875

[22] Filed: Apr. 19, 1994

[51] Int. Cl.[6] .......... F16J 1/04

[52] U.S. Cl. .......... 123/193.4; 29/888.04

[58] Field of Search .......... 123/193.6, 193.4; 29/888.04, 888.048

[56] References Cited

U.S. PATENT DOCUMENTS

| | | | |
|---|---|---|---|
| 3,882,841 | 5/1975 | Silverstein | 123/193.4 |
| 4,656,711 | 4/1987 | Yagi et al. | 29/888.04 |
| 4,831,977 | 5/1989 | Presswood | 123/193.6 |
| 4,878,466 | 11/1989 | Storchevoi | 123/193.4 |
| 4,986,231 | 1/1991 | Brown | 123/193.6 |
| 4,987,865 | 1/1991 | Schenkel | 123/193.6 |
| 5,074,264 | 12/1991 | Mielke | 123/193.6 |
| 5,251,540 | 10/1993 | Rhodes et al. | 123/193.6 |
| 5,267,505 | 12/1993 | Roper | 123/193.4 |

FOREIGN PATENT DOCUMENTS

| | | | |
|---|---|---|---|
| 2-176147 | 7/1990 | Japan | 123/193.4 |
| 2-271060 | 11/1990 | Japan | 123/193.4 |

*Primary Examiner*—David A. Okonsky
*Attorney, Agent, or Firm*—Karl F. Barr, Jr.

[57] ABSTRACT

An apparatus and method for determining the optimum outer dimensions of a piston are disclosed. The piston has a crown with a ring belt and a skirt depending therefrom. Openings in the ring belt are configured to receive abradable rod members having end portions which extend radially outwardly from the piston surface. The radial positions of the outer end portions of the rod members are adjustable so as to locate the rod ends closely adjacent to the walls of an associated engine cylinder. Upon operation of the piston within the cylinder the rods are abraded to reveal the optimum clearance of the piston, relative to the cylinder wall, at that location.

5 Claims, 3 Drawing Sheets

APPARATUS AND METHOD FOR DETERMINING PISTON DIMENSION

TECHNICAL FIELD

The invention relates to pistons for internal combustion engines and, more particularly, to an apparatus and a method for optimizing piston peripheral dimensions.

BACKGROUND

Significant quantities of unburned hydrocarbons exhausted from an internal combustion engine originate within the volume defined by the piston side wall, the upper piston ring and the engine block cylinder wall. The volume, referred to as the cylinder wall crevice volume is of concern in the development of engines with reduced engine-out emissions. Crevice volume reduction can be achieved by reducing the excess clearance between the piston top land and the cylinder bore wall. Numerous factors govern the design of the cylinder wall crevice volume including piston and cylinder bore thermal growth and mechanical distortion, production variabilities, engine dynamics and noise concerns.

Historically pistons have been designed with excess clearance between the piston land and the cylinder wall to avoid excessive wear caused by piston-cylinder contact and to minimize generated noise. Such techniques employed to size pistons have resulted in larger than optimum crevice volumes. Attempts to improve piston sizing have focused on a method of coating the exterior of the piston with an abradable material that wears during engine operation to reveal an improved peripheral configuration. One shortcoming of this method lies in the insulative effect of the coating which leads to a disruption in the heat transfer characteristics within the cylinder. Typically, with this method, piston temperatures are higher than would normally be experienced during operation resulting in increased piston thermal growth and less than optimum final piston dimensions.

SUMMARY OF THE INVENTION

The present invention is directed to an apparatus and a method for establishing an optimum peripheral outline for a piston in an internal combustion engine such that the cylinder wall crevice volume is minimized. The apparatus of the present invention includes a piston having a crown or head portion that defines the top, combustion exposed surface when installed in an engine cylinder bore. Depending from the piston head is a ring belt having a ring land, a ring groove and a piston ring disposed within the groove. A piston skirt depends from the ring belt and includes a through bore for receiving a piston pin when the piston is operably mounted within an engine cylinder.

Circumferentially disposed, in spaced relationship to one another about the outer perimeter of the piston ring land are a number of radially, outwardly extending, abradable rod members. The rod members are adjustable, in the radial direction, such that the outer end of each rod may be situated in a closely adjacent relationship to the wall of the engine cylinder when the piston is installed therein. Operation of the piston within the cylinder causes the end of each rod to contact the cylinder wall as the piston moves through its reciprocable cycle and as the engine and piston undergo dimensional changes inherent in the operation thereof. As contact occurs over an extended period of operation, the rods are shortened, through abrasion, to an optimum, maximum length. The radial location of each rod end can thus be used to define an optimum peripheral dimension for the piston with respect to a given engine cylinder. Due to the small area of the radially extending rods, the thermal characteristics of the engine function normally during operation with the rods installed reflecting realistic thermal growth for sizing purposes and allowing the piston designer to minimize the piston crevice volume and its effect on engine-out hydrocarbon emission.

These and other features, objects and advantages of this invention will be more apparent from the following Detailed Description and Drawings.

DESCRIPTION OF THE PREFERRED EMBODIMENT

Figure 1:
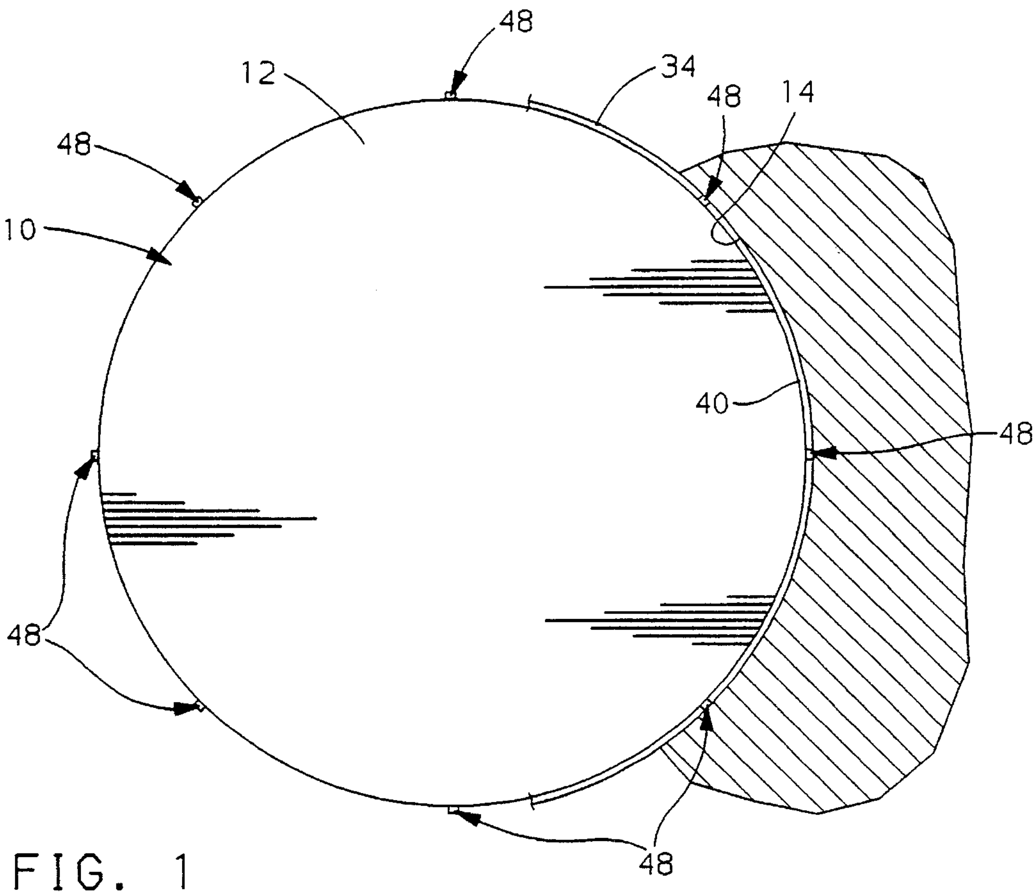
FIG. 1 is a plan view of a piston embodying features of the present invention.
Figure 2:
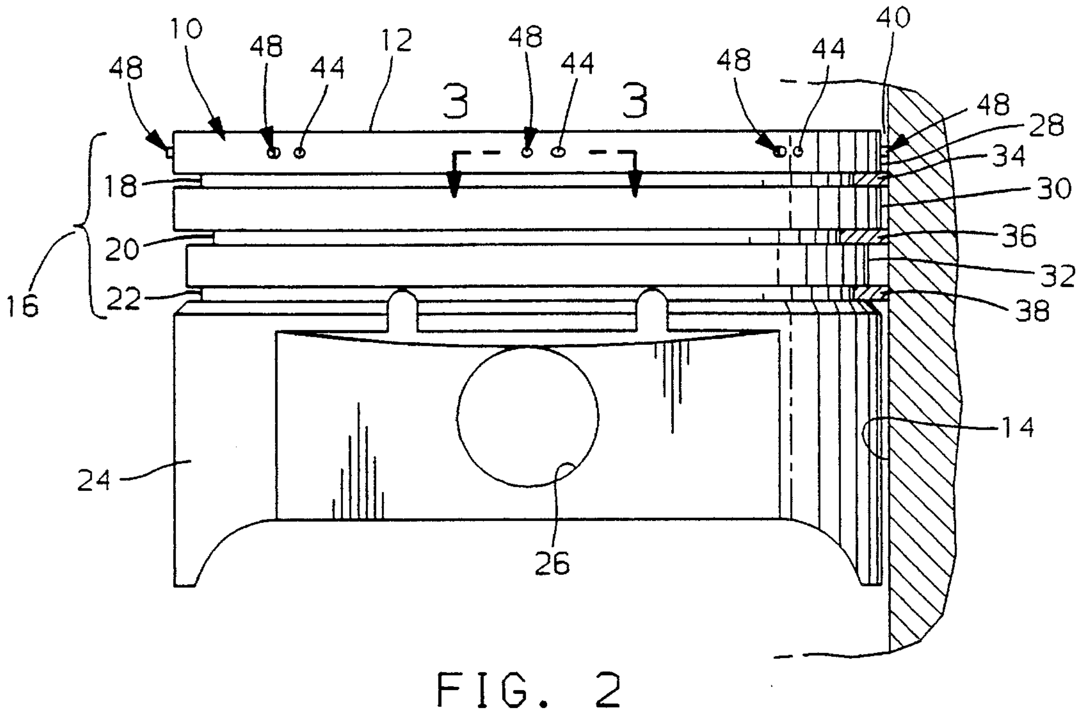
FIG. 2 is a side view of the piston of FIG. 1.

In FIGS. 1 and 2 there is illustrated a piston, referred to generally as 10, for operation in the cylinder bore of an internal combustion engine. The piston 10 includes a crown or head 12 that defines a top, combustion exposed surface, when installed in an engine cylinder 14. Depending from the head 12 is a ring belt portion 16 including first, second and third ring grooves 18,20,22, respectively. Depending from the ring belt portion 16 is a piston skirt 24 having a through bore 26 in which a piston pin is disposed when the piston in operably installed within and engine. Together, the ring belt portion 16 and piston skirt 24 define a cylindrical piston side.

Returning to the ring belt portion 16, a first or top ring land 28 is defined between the top 2 of the piston and the first ring groove 18. Likewise, lands 30, 32 are defined by the first and second, and by the second and third ring grooves respectively. The ring grooves are adapted to receive piston rings 34,36,38 which operate to contain the combustion event within the combustion chamber, not shown, and to prevent the passage of oil from the engine crankcase to the combustion chamber.

Figure 3:
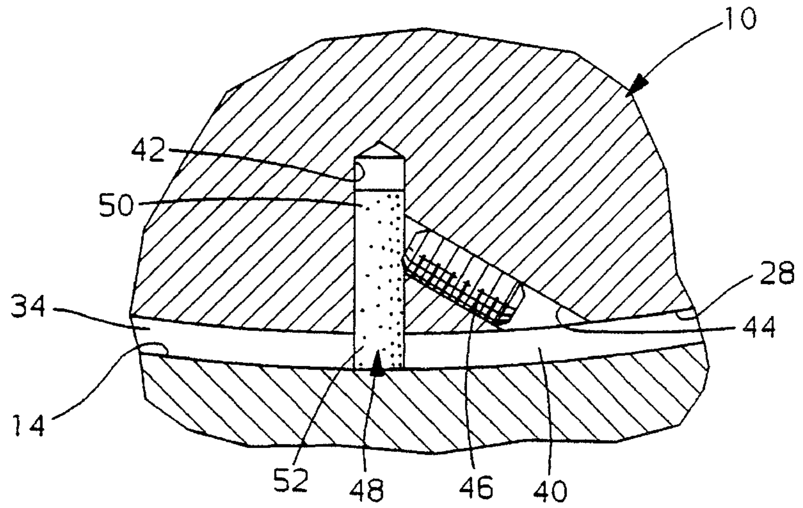
FIG. 3 is a sectional view taken along line 3—3 of FIG. 2.

Defined by first piston land 28, piston ring 34 and the cylinder wall 14 is the piston crevice volume 40, FIGS. 2 and 3, whose dimensions are primarily a function of the relationship between the piston land peripheral dimension and the cylinder wall. This relationship is subject to change across the engine operating cycle resulting in a variation in crevice volume during engine operation. It is recognized that minimization of the piston crevice volume 40 is desirable for reducing the emission of unburned hydrocarbons from the engine since combustion within the volume is difficult to achieve. In order to best achieve a minimization of the crevice volume, the clearance between the first land 28 and the cylinder wall 14 must be reduced while taking into account the variation in piston and cylinder geometries which occur in the assembly of the engine and during its operation.

Referring now to FIGS. 1,2 and 3, the piston land 28 is provided with a series of radially inwardly extending openings 42 which are located in spaced relationship to one another about the piston circumference. Associated with each of the openings 42 is a second intersecting bore 44 configured to receive a threaded set screw 46, such that advancement of the set screws 46 will cause interference with the openings 42. Disposed within each of the openings 42 in land 28 is an abradable rod member 48. The rod member must be thermally durable as well as being able to withstand the moving and combustion forces within the cylinder during operation. On the other hand the rod material must be easily abradable without damaging the internal engine components. A preferred material for constructing the rod members is graphite, although other suitable materials may be substituted therefore. Each rod member 48 has a first end 50 fixed within a radial opening 42 by the interference action of an adjustable set screw 46 and a second, outer end 52 which extends radially outwardly from the land 28. The action of the set screw 46 allows the second end 52 of each rod member 48 to be adjusted radially such that, when the piston 10 is installed in a cylinder 14 of an engine, each second end 52 of each rod 48 can be positioned closely adjacent to the cylinder wall of the engine.

Figure 4:
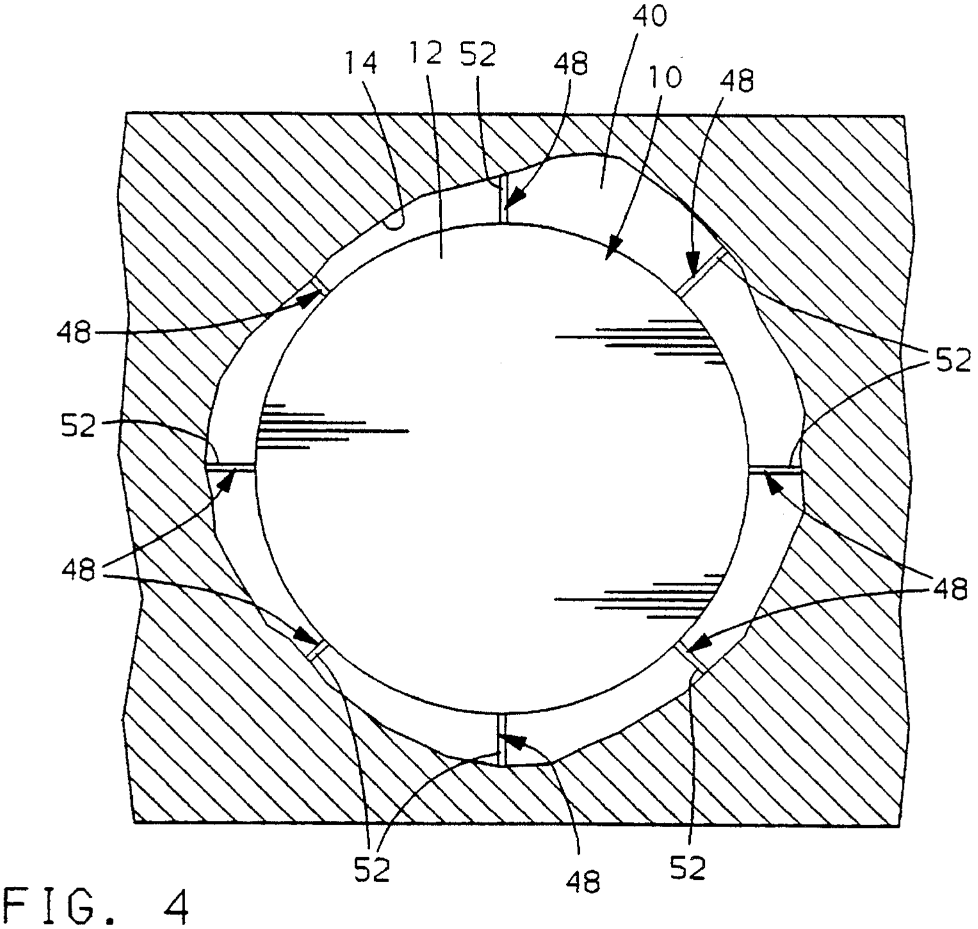
FIG. 4 is a schematic view of a piston embodying the present invention installed in an engine cylinder.
Figure 5:
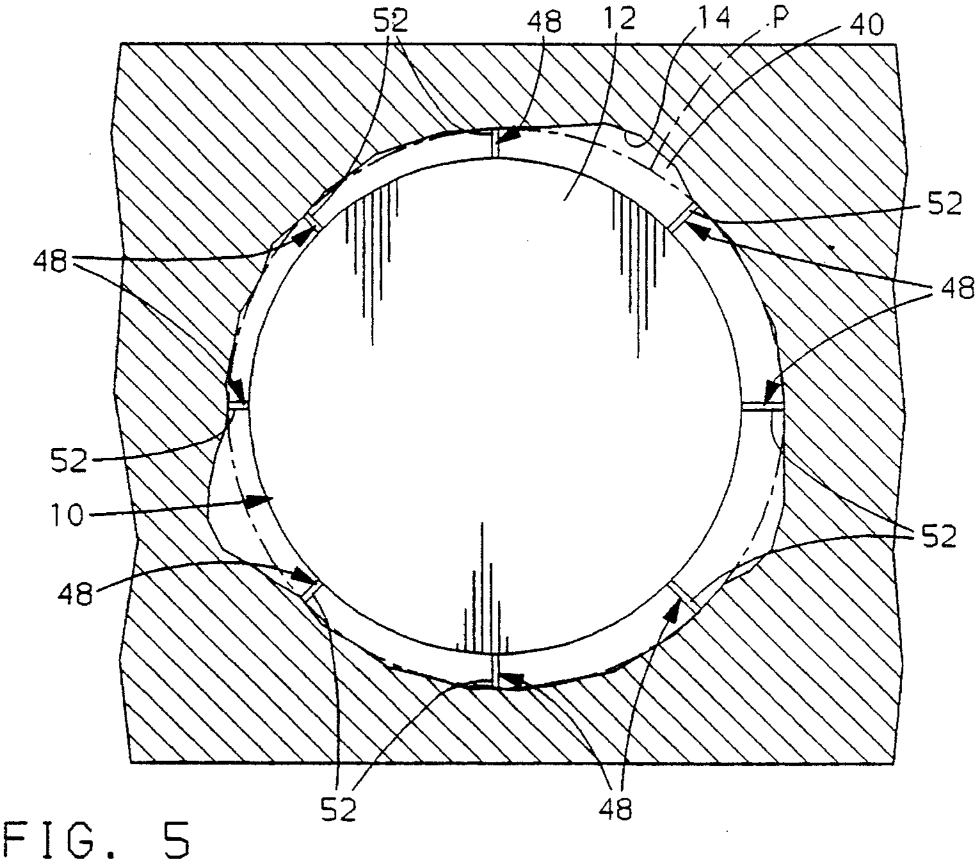
FIG. 5 is a view of the piston of FIG. 4 following its operation within the cylinder.
Figure 6:
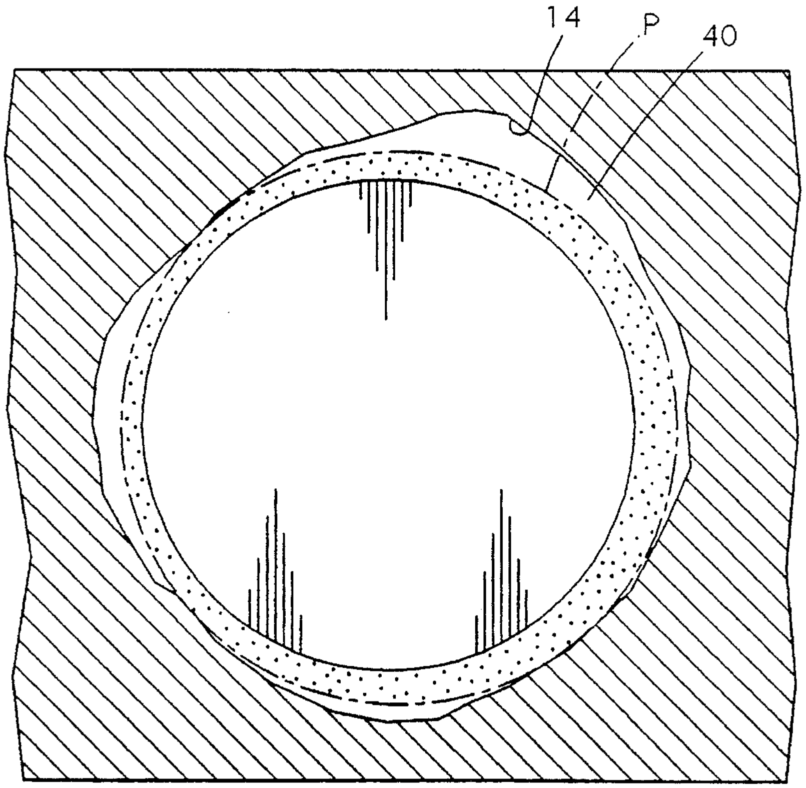
FIG. 6 is a view of the piston of FIG. 5 with an optimum piston peripheral outline shown in phantom.

Referring now to FIGS. 4–6, a method for determining the optimum piston peripheral dimensions using the above apparatus will now be described. In FIG. 4, piston 10 is shown installed in a cylinder 14 of an engine in which the cylinder bore is shown in an exaggerated, out-of-round position for the purposes of description only. Cylinder wall dimensions which correspond to the circumferential locations of each rod member are used to determine the radial setting of the rods 48 such that the rod ends 52 are positioned closely adjacent to the cylinder wall surface. Following installation of the piston 10, the engine is operated over a desired operating cycle which is preferably calculated to run the system through its entire range of thermal and mechanical stress and associated dimensional change. During the operating cycle, the changing dimensions of the piston 10 and the engine cylinder 14 cause the rod members 48 to be abraded, FIG. 5, to such an extent that they will represent a minimum acceptable clearance between the piston and the cylinder wall across the entire engine operating cycle. The radial position of the outer ends 52 of each abradable rod 48 may be used to determine an optimum piston peripheral dimension "P" or outline, FIGS. 5 and 6, which will minimize the piston crevice volume 40 while assuring that sufficient clearance exists so that premature wear and noise, caused by piston contact with the cylinder wall, are avoided.

The apparatus described herein, is directed to a piston assembly which is useful for determining optimum piston-cylinder wall clearance. The apparatus, although described with reference to the piston ring belt and crevice volume, is well suited to other piston peripheral locations, such as the skirt, where minimum clearances are of concern to the engine designer. It should be apparent that the present invention can be used to determine position specific dimensions as well as overall piston configurations.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiment may be modified in light of the above teachings. The embodiment described was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiments of the invention in which an exclusive property or privilege is claimed are defined as follows:

1. An apparatus for determining an external dimension of a piston for a cylinder of an internal combustion engine comprising a piston having a crown which defines a top portion and a cylindrical ring belt, depending from said crown, to terminate in a skirt portion, said ring belt having a ring groove extending about the circumference thereof adapted to receive a compression ring, said top portion and said ring groove defining a ring land therebetween, said ring belt configured to receive a radially outwardly extending, abradable rod member having an outward end adapted to reside adjacent to said cylinder of said engine when said piston is installed therein and to contact and abrade against said cylinder when said piston is operated therein, said outward end of said abradable rod member, after operation of said piston in said cylinder, defining said external dimension of said piston.

2. An apparatus for determining a peripheral outline of a piston for operation in a cylinder of an internal combustion engine comprising a piston having a crown which defines a top portion and a cylindrical side, depending from said crown, said side configured to receive circumferentially spaced, radially outwardly extending, abradable rod members, each having an outward end adapted to reside adjacent to said cylinder of said engine when said piston is installed therein and to contact and abrade against said cylinder when said piston is operated therein, each outward end of said abradable rod members, following said operation of said piston in said cylinder, operable to define said peripheral outline of said piston.

3. An apparatus for determining a peripheral outline of a piston for operation in a cylinder of an internal combustion engine, as defined in claim 2, said ring belt comprising circumferentially spaced, radially extending cylindrical bores configured to receive said abradable rod members.

4. An apparatus for determining a peripheral outline of a piston for operation in a cylinder of an internal combustion engine, as defined in claim 3, said ring belt comprising circumferentially spaced, threaded bores, each threaded bore oriented to intersect one of said radially extending cylindrical bores and configured to receive a threaded set screw, said screws operable to fix the radial position of said abradable rods and said outward ends thereof.

5. A method of determining a peripheral dimension of a piston for operation in a cylinder of an internal combustion engine comprising the steps of preparing a piston having a crown which defines a top portion, a cylindrical ring belt which depends from said crown, and a radially outwardly extending, abradable rod member having an outward end, installing said prepared piston in a cylinder such that said outward end of said abradable rod member is disposed adjacent to said cylinder, operating said prepared piston in said cylinder such that said abradable rod member contacts and abrades against said cylinder as said piston moves, measuring the position of said outward end of said rod relative to said cylindrical ring belt to define a peripheral dimension of said piston.

* * * * *